Feb. 8, 1966 A. C. SCHROEDER 3,233,529
MACHINE FOR HANDLING SINGLE PLY CASES
Filed July 8, 1963 14 Sheets-Sheet 1

FIG. I

INVENTOR.
ARTHUR C. SCHROEDER.
D. Emmett Thompson
HIS ATTORNEY.

INVENTOR.
ARTHUR C. SCHROEDER.
BY.
D. Emmett Thompson
HIS ATTORNEY.

Feb. 8, 1966  A. C. SCHROEDER  3,233,529
MACHINE FOR HANDLING SINGLE PLY CASES
Filed July 8, 1963  14 Sheets-Sheet 4

FIG. 5

INVENTOR.
ARTHUR C. SCHROEDER
BY
D. Emmett Thompson
HIS ATTORNEY.

Feb. 8, 1966     A. C. SCHROEDER     3,233,529
MACHINE FOR HANDLING SINGLE PLY CASES
Filed July 8, 1963     14 Sheets-Sheet 5

FIG. 6
FIG. 7

INVENTOR.
ARTHUR C. SCHROEDER.
BY.
D. Emmett Thompson
HIS ATTORNEY.

INVENTOR.
ARTHUR C. SCHROEDER.
BY D. Emmett Thompson
HIS ATTORNEY.

Feb. 8, 1966        A. C. SCHROEDER         3,233,529
            MACHINE FOR HANDLING SINGLE PLY CASES
Filed July 8, 1963                    14 Sheets-Sheet 13

INVENTOR.
ARTHUR C. SCHROEDER.
BY.
D. Emmett Thompson
HIS ATTORNEY.

INVENTOR.
ARTHUR C. SCHROEDER.
BY
D. Emmett Thompson
HIS ATTORNEY.

United States Patent Office 3,233,529
Patented Feb. 8, 1966

3,233,529
MACHINE FOR HANDLING SINGLE PLY CASES
Arthur C. Schroeder, Skaneateles, N.Y., assignor to Demiquad Sales Corporation, Syracuse, N.Y., a corporation of New York
Filed July 8, 1963, Ser. No. 293,383
10 Claims. (Cl. 93—53)

This invention relates to carton handling machines of the type that function to successively remove flat collapsed paperboard cartons from a stack, advance a selected carton to a loading or packing station, where the carton is expanded to tubular form, and articles are inserted in the expanded carton, which is then advanced to a compression station. During the advancement of the packed carton, adhesive is applied to the end flaps, and they are folded to closed position. The cartons, up to the present time, have been formed of heavy stiff corrugated paperboard having three or more layers, or plies.

This invention has as an object a carton handling machine embodying a structural arrangement which functions for the handling of single ply paperboard cartons. Such light weight single ply cartons are particularly suitable and economical for the packaging of light weight articles such, for example, as small packages of breakfast food and the like.

The invention consists in the novel features and in the combinations and constructions hereinafter set forth and claimed.

In describing this invention, reference is had to the accompanying drawings in which like characters designate corresponding parts in all the views.

The machine consists generally of a frame in which there is arranged an elongated guideway. A magazine is arranged above the rear portion of the guideway and is adapted to receive a stack of the single ply cartons in flat collapsed form. These cartons are formed with an unadhered flap exteriorly on one side or edge of the carton, and extending lengthwise of the carton. The flat collapsed cartons are positioned in the magazine with the sides having the unadhered flaps downwardly, and with the flaps facing forwardly.

The machine further includes a carton feeding mechanism having a carton selecting blade which, upon rearward movement of the feeding mechanism, is moved upwardly into engagement with the flap on the lowermost carton in the stack, effecting rearward movement of that carton for disposition on the guideway. Upon forward movement of the carton feeding member, the flat collapsed carton is moved to the packing station. Means is provided at the packing station, operable in conjunction with the carton advancing mechanism, to expand the carton to tubular form, the carton being disposed transversely of the guideway. End flap closing mechanisms function to close selected ones of the end flaps at one end of the carton, and an article loading mechanism functions to insert a predetermined number of articles, or small packages, into the expanded carton. The loaded carton is advanced from the packing station past glue applicators which apply glue to selected flaps at both ends of the packed carton and thereafter, the packed carton is advanced past an end flap folding mechanism which functions to completely seal the end flaps at both ends of the carton and, upon further advancement, the carton is moved through a compression station.

Figure 2:
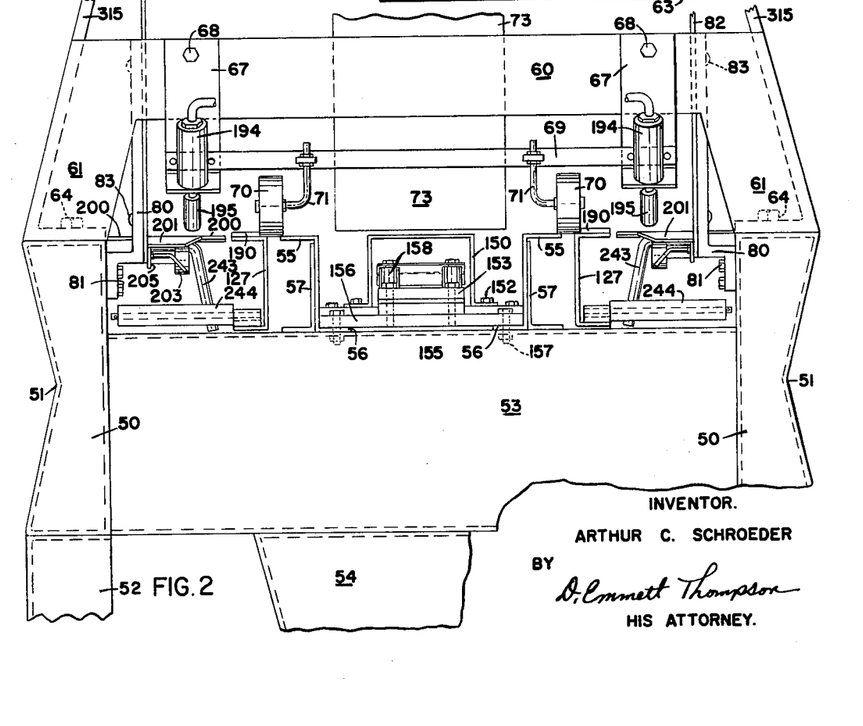
FIGURE 2 is a rear end elevational view with parts broken away.
Figure 4:
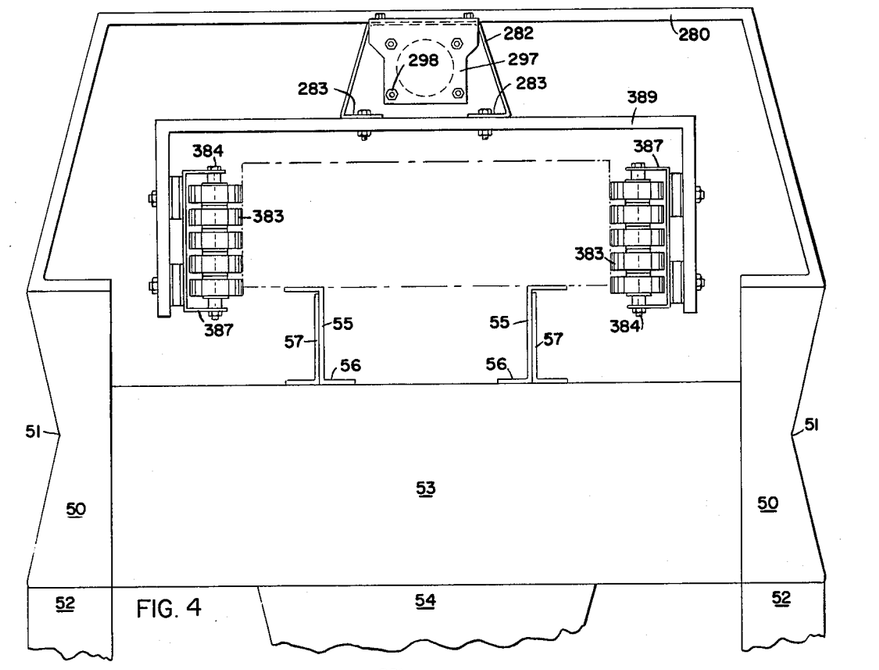
FIGURE 4 is a front end elevational view.

The machine includes a pair of elongated box-shaped side members 50 extending lengthwise of the machine in spaced apart parallel relation. The outer surfaces of the side members converge inwardly, as at 51, see FIGURES 2 and 4. The side members are supported at their rear ends by a pair of legs 52. An inwardly facing channel member 53 extends transversely between the rear and front ends of the side members 50 and is fixedly secured thereto, as by welding, see FIGURES 2, 4, 5 and 6. A pair of supporting rails 55 extend in spaced parallel relation between the side members 50. The rails 55 are fixedly secured at their ends to the cross members 53. The rails 55, see FIGURES 2, 4 and 7, are Z-shaped in cross section, having inwardly extending flanges 56 at their lower edges. The rails 55 are reinforced by angle members 57.

An inverted U-shaped rear cross plate 60, disposed in vertical edgewise position, has downwardly diverging leg portions 61, see FIGURE 2, terminating in forwardly extending flanges 63, see FIGURE 6. These flanges are bolted to the upper edges of the side members 50, as by bolts 64. There are a pair of vertically disposed plates 67 attached to the cross member 60, as by bolts 68, these plates depending from the cross member 60 and support a cross bar 69. A pair of rollers 70 are journalled on the lower ends of brackets 71 mounted on the cross bar 69 and are adjustable vertically relatively thereto.

A plate 73 is fixed to the cross member 60 at the central portion thereof, this plate extending upwardly from the cross member, and forming the rear wall of a carton magazine. The plate 73 extends downwardly and terminates in upwardly spaced relation from the top edges of the fixed guide rails 55. A supply of flat collapsed paperboard cartons C is arranged in stack formation in the magazine, and the spacing between the lower edge of the back plate 73 and the upper sides of the fixed guide rails 55 is such as to permit rearward movement of the lowermost carton in the stack, as will be hereinafter explained.

Brackets 80 are fixedly secured at their lower ends to the inner side walls of the side members 50, as by screws 81, see FIGURE 2. These brackets extend upwardly, and a sheet metal plate 82 is fixed to each bracket, as by rivets 83.

Figure 5:
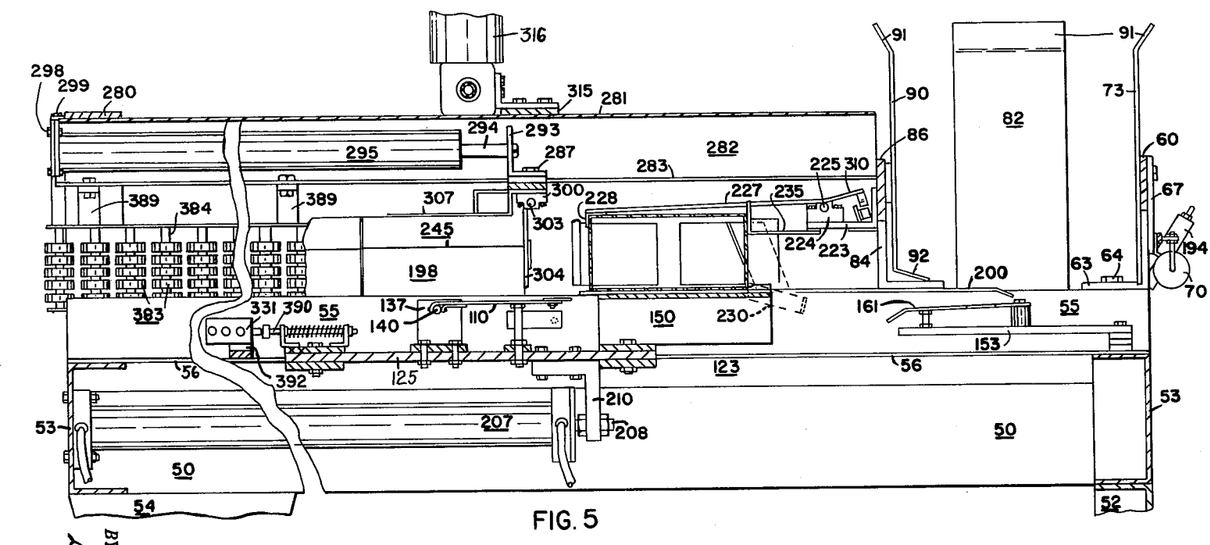
FIGURE 5 is a lengthwise sectional view taken on line 5–5, FIGURE 1, showing the carton selecting mechanism in forward position with a carton in expanded form at the loading station.
Figures 6, 7:
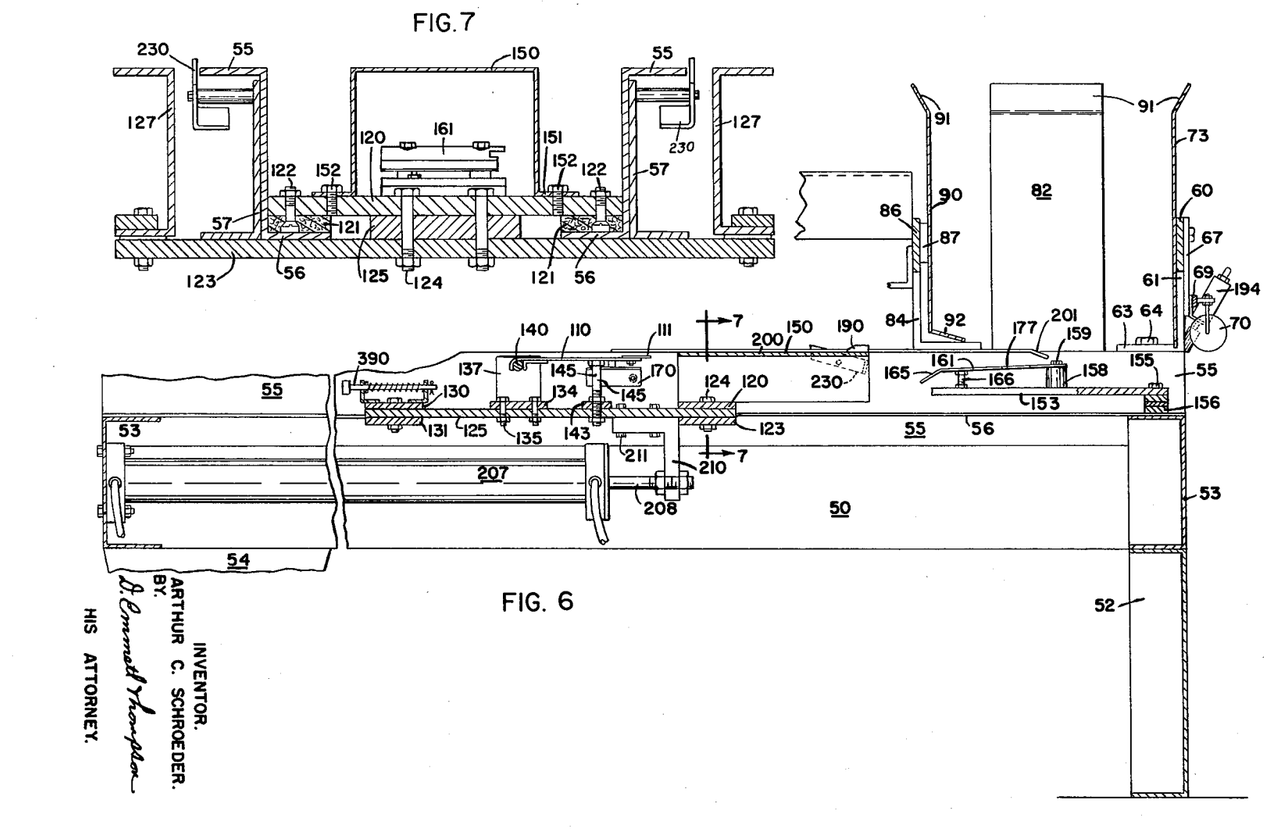
FIGURE 6 is a view, similar to FIGURE 5, showing the carton selecting mechanism moved rearwardly a short distance from its forward position.
FIGURE 7 is a view taken on line 7—7, FIGURE 6.

Rigid angle brackets 84 are fixed to the top edge of the side members 50, as by bolts 85, see FIGURES 5 and 6. A cross bar 86 is secured to the upper ends of the angle brackets 84. Fixedly secured to the cross bar 86 is a spacer 87 to which, in turn, is secured the front plate 90 of the magazine. The upper ends of the plates 73, 82, 90, are bent, or flared outwardly, as at 91. The lower edge of the front plate 90 is formed with a flange 92 inclining downwardly and rearwardly, and which serves to support the forward edge of the stack of cartons C, as shown clearly in FIGURES 8 and 11. The rear edge of the stack is supported on the fixed rails 55.

Figure 26:
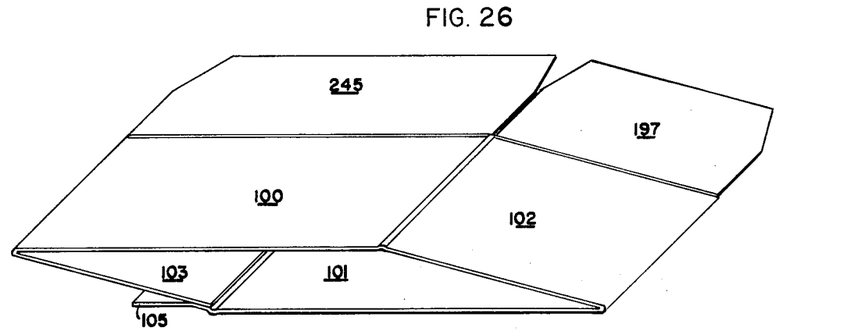
FIGURE 26 is a sectional view of one of the flat collapsed cartons.

The cartons are of the type shown in FIGURE 26 having opposed top and bottom panels 100, 101, of substantial width, and side panels 102, 103, of lesser width. The bottom panel 101 has an edge portion overlapping the adjacent edge portion of the adjacent side panel 103, and is bonded thereto by adhesive to form the side wall seam of the carton, which is located at one corner edge of the expanded carton. The panel 101 has a flap 105 extending beyond the adhered overlapping surfaces at the side wall seam. These cartons are formed of single ply paperboard, as distinguished from the conventional multi-layer corrugated board carton. The cartons are placed in the magazine with the panels 101, 103, facing downward, and the unadhered flap 105 facing forward.

Figure 8:
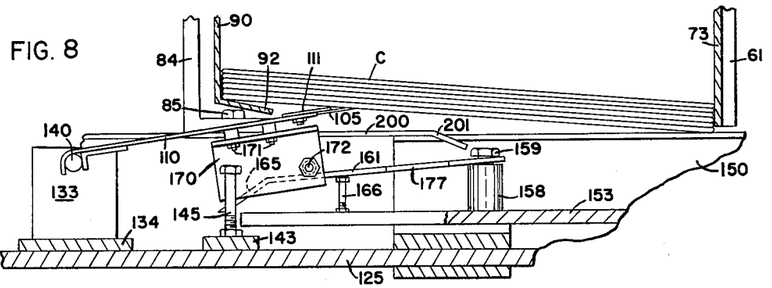
FIGURE 8 is a lengthwise sectional view of the lower portion of the carton magazine showing the carton selecting blade initially engaging the lowermost carton in the magazine.
Figure 9:
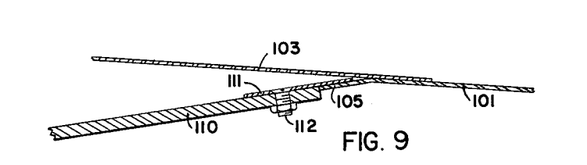
FIGURE 9 is an enlarged center sectional view of the carton engaging blade and contiguous portion of the carton engaged thereby, as shown in FIGURE 8.
Figure 10:
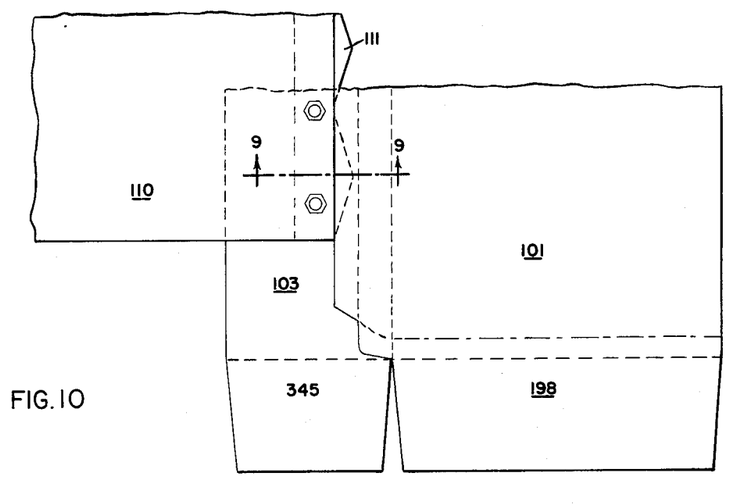
FIGURE 10 is an inverted plan view looking upwardly in FIGURE 9 showing the portion of the carton selecting blade and contiguous portion of the carton.
Figure 11:
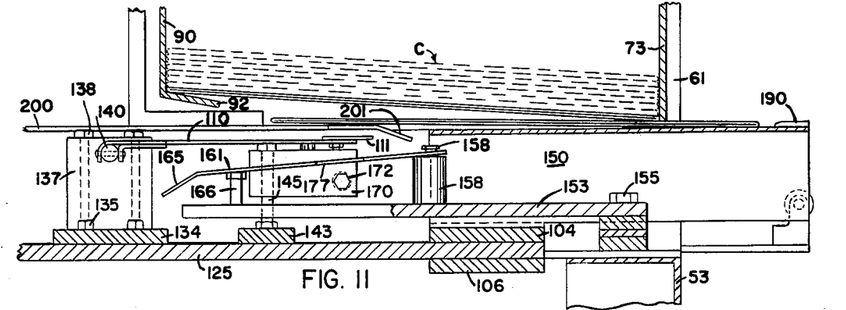
FIGURE 11 is a lengthwise sectional view of the carton selecting mechanism moved to its rear position and with the lowermost carton removed from the magazine.

The cartons are removed successively from the magazine by moving the lowermost carton first a short distance rearwardly, to move the forward portion of the panel 103 from the supporting flange 92 of the front magazine wall 90—that is, the lowermost carton is moved from the position shown in FIGURE 8 to the position shown in FIGURE 11. This selection of the lowermost carton is effected by a selector member 110 appearing in FIGURES 6, 7, 8, 11 and 12. The selector member is in the form of a flat rigid plate, to the forward edge of which is secured a relatively thin blade 111, as by screws 112. The blade 111 has a portion extending rearwardly for entrance between the panel 103 and the unadhered flap 105, the rear end of the blade terminating in such spaced relation from the rear edge of the member 110 that the rear edge of the blade 111 does not engage the overlapping side wall seam of the carton, but rather the forward edge of the flap 105 is engaged by the rear edge of the plate 110, as shown in FIGURES 8 and 9. The member 110 is moved rearwardly a sufficient distance to permit the forward edge of the lowermost carton to drop off from the flange 92 onto the supporting rails 55, as shown in FIGURE 11. As previously stated, the lower edge of the rear magazine wall plate 73 terminates a sufficient distance above the rails 55 to permit the rear edge portion of the lowermost carton to pass rearwardly from the magazine. The carton selector assembly is carried by a carton feeding mechanism mounted for reciprocation on and between the rails 55.

Referring to FIGURES 5, 6 and 7, a plate 120 extends transversely between the vertical flanges of the fixed rails 55, and has affixed to the under surface of its end portions friction material 121, by means of bolts 122. The friction material 121 has a sliding engagement with the inwardly extending flanges 56 of the rails 55. A bar 123 is secured to the plate 120, as by bolts 124, and there is a spacer member 125 intermediate the plate 120 and the bar 123, so that the bar 123 has sliding engagement with the under surface of the flanges 56. The bar 123 extends laterally outwardly from the rails 55, and it is affixed to the ends of bars 127, see FIGURES 1, 7 and 12. These bars are channel-shaped in cross section, and extend rearwardly a distance from the cross bar 123.

The spacer bar 125 extends forwardly from the bar 123 and to its forward end is secured cross plates 130, 131, these plates being comparable to the members 120, 123. With this arrangement, the spacer bar 125 is mounted for reciprocation between the fixed rails 55.

A plate 134 is fixed to the bar 125 as by bolts 135, see FIGURES 5, 6, 7 and 12. The plate 134 also extends transversely of the bar 125, and bearing blocks 137 are fixed to the ends of the plate 134, as by bolts 138. The bearing blocks 137 extend upwardly from the plate 134 and are apertured transversely to rotatably receive a shaft 140 to which is affixed the carton selector plate 110. A support piece 143 is affixed to the bar 125 and carries an adjustable stop screw 145 to limit downward movement of the selector 110 about the axis of the shaft 140. When the selector plate 110 is resting on the stop screw 145, the plate is positioned in a plane slightly below the top surfaces of the rails 55, see FIGURES 5 and 6.

Figure 3:
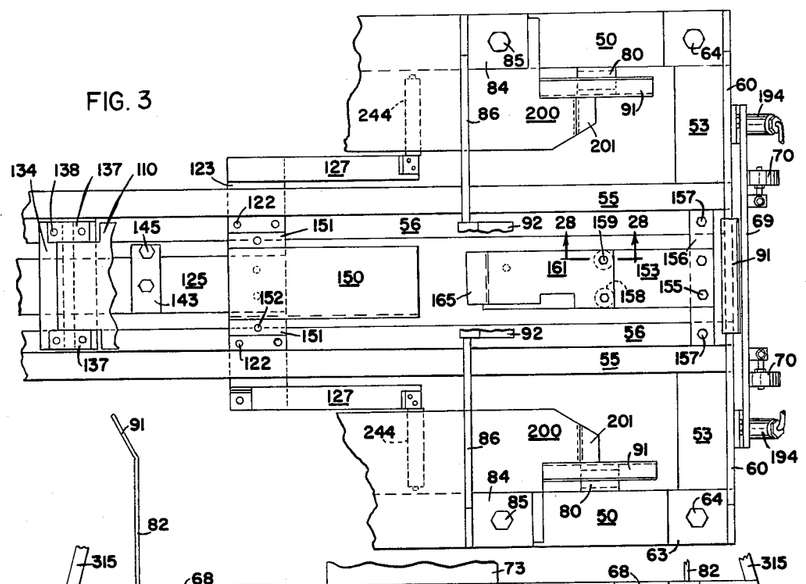
FIGURE 3 is a top plan view of the rear portion of the machine showing the carton selecting and feed mechanism moved forwardly a major portion of its travel.

There is also affixed to the slide bar assembly 125 an inverted U-shaped member 150 extending rearwardly and having a length substantially the same as the outer movable rails 127. The forward end portion of this member 150 is formed with laterally extending flanges 151 positioned on the cross member 120 and affixed thereto, as by screws 152, see FIGURES 3 and 7. The purpose of the box shaped member 150 is to support the central portion of the carton as it is fed forward from the magazine supply.

Figure 27:
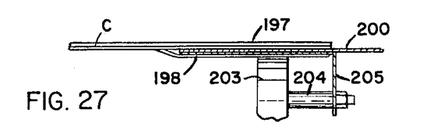
FIGURE 27 is a view taken on line 27—27, FIGURE 12.
Figure 28:
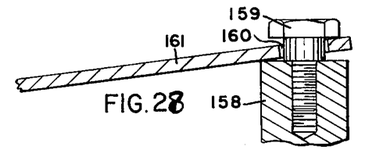
FIGURE 28 is a view taken on line 28—28, FIGURE 3.

There is a plate 153 positioned centrally between the rails 55 beneath the rear side of the carton magazine. This plate 153 is fixedly secured at its rear end by bolts 155 to a cross spacer 156 which, in turn, is fixed to the upper surface of the end cross frame member 53, by bolts 157, see FIGURES 2 and 6. There is fixed to the top surface of plate 153, substantially midway between its ends, a pair of pillars 158. These pillars are tapped to receive shouldered bolts 159 which pass through enlarged apertures 160 in a cam plate 161, see FIGURE 27. The height of the shouldered portion of the bolts is somewhat in excess of the thickness of the cam plate 161, so that the cam plate normally assumes a position slightly inclined downwardly and forwardly, see FIGURES 6 and 11. The forward end of the cam plate is inclined downwardly, as at 165. The down position of this plate is controlled by a stop screw 166 threaded into the outer end portion of the supporting plate 153.

Figure 12:
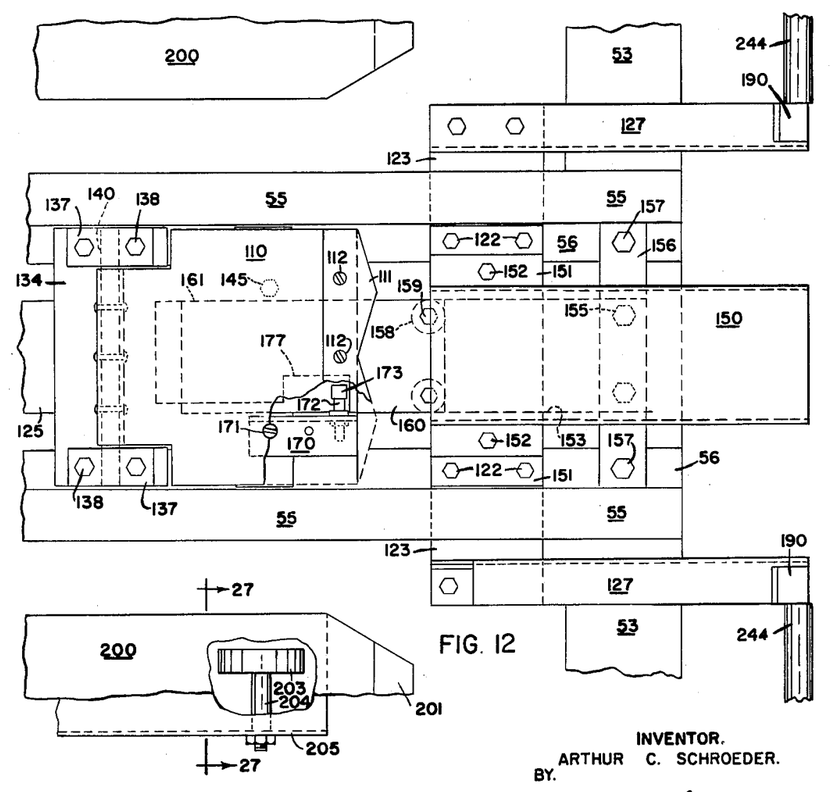
FIGURE 12 is a top plan view of the structure as shown in FIGURE 10.

The selector plate 110 has affixed to its under side a small angle piece 170, as by screws 171, see FIGURES 6 and 12. The angle piece 170 has an inwardly extending stud 172 on which is journalled a roller 173. Upon rearward movement of the feeding selector assembly, the roller 173 rides up the inclined end surface 165 of the cam plate, moving the selector 110 upwardly about its mounting shaft 140 to move the blade 111 against the under side of the lowermost carton in the magazine, whereby the blade enters between the unsecured flap 105 and the adjacent side wall panel 103, FIGURE 8. As previously stated, the end edge of the selector plate 110 engages against the free edge of the flap 105, and continued rearward movement of the selector plate will move the lowermost carton rearwardly, as shown in FIGURE 11. When this lowermost carton has been so moved rearwardly, the roller 173 drops into a notch 177 formed in the side of the cam plate 161, permitting the selector plate 110 to descend on the stop 145.

During the above operation the feeding assembly, including the bar 125, is moved rearwardly carrying the bars 127 rearwardly. Carton engaging projections 190 are fixed to the upper surfaces of the bars 127 at the rear ends thereof and serve, upon forward movement of the feeding assembly, to engage the rear edge of the displaced carton, and move the collapsed carton forwardly along the rails 55.

During the rearward movement of the lowermost displaced carton, the carton is held against the rails 55 by the rollers 70, these rollers being positioned immediately above the adjacent surfaces of the rails 55, 127. When the case has been moved to the rearward position, fluid is supplied to the upper ends of the cylinders 194 carried by the brackets 67, this causing downward movement of the plungers 195 which engage the end flaps 197 on the carton side wall 102, bending the flaps 197 downwardly, and also bending downwardly the flaps 198 on the side wall 101, which flaps are now positioned immediately beneath the flaps 197.

There is an elongated plate 200 fixedly secured to the top surface of each of the side members 50. These plates extend inwardly therefrom, and are formed with downwardly and rearwardly inclined flanges 201 at their rear ends, these flanges being located substantially in line with the central portion of the magazine, see FIGURES 5, 6, and 12.

As the feeding assembly moves forwardly, moving the displaced carton with it, the downwardly bent end wall tabs 198 advance under the plates 200 and, prior to the time the end flaps 197 reach the ends 201 of plates 200, they have passed out from in under the rollers 70 and spring back upwardly into their normal plane, whereby they pass over the upper surface of the plates 200. The purpose of the downwardly inclined end portions 201 is to make certain that the flaps 198 do pass on the upper surface of the plates 200.

Angle plates are secured to the under sides of the plates 200, and rollers 203 are journalled for rotation on studs 204 mounted in the depending legs 205 of these angle plates, see FIGURES 2, 12 and 26. The rollers 203 serve to maintain the flaps 198 in horizontal position underneath the plates 200 during the advancement of the carton.

The feeding assembly is reciprocated by a fluid motor consisting of a cylinder 207, FIGURES 5 and 6, fixedly secured at its forward end to the front cross piece 53. The piston rod 208 is secured to an angle bracket 210 depending from the bar 125 and being fixed thereto, as by bolts 211. The forward movement of the feeding assembly is sufficient to advance the selected flat carton to full expanded form at the carton expanding station located forwardly of the carton magazine, see FIGURE 6.

Figure 13:
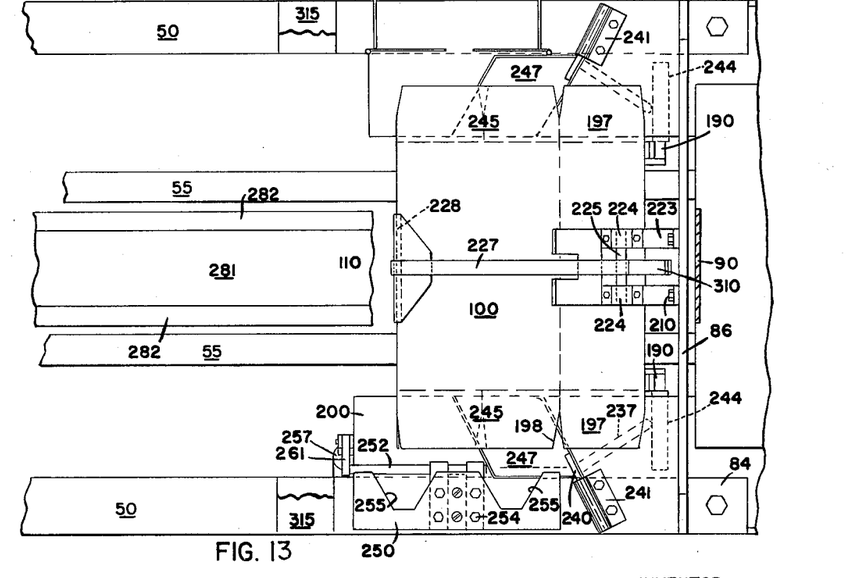
FIGURE 13 is a plan view of a collapsed carton advanced into juxtaposition with the carton expanding mechanism at the loading station.
Figure 14:
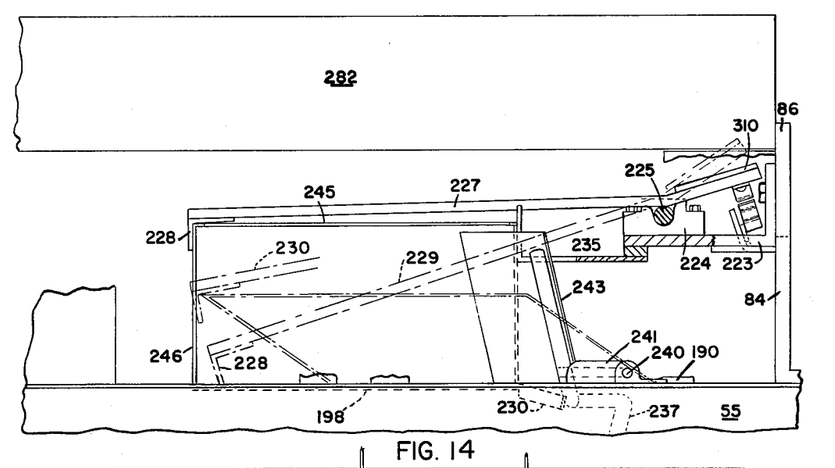
FIGURE 14 is a view looking upwardly in FIGURE 13 and with the carton advanced further to full rectangular expanded form.

An angle bracket 223 is secured to the cross member 86, FIGURES 5, 13 and 14. This bracket carries a pair of bearings 224 in which a shaft 225 is journalled. A bar 227 is fixed to the shaft and extends forwardly therefrom. The bar 227 is provided at its forward end with an angle member having a depending flange 228. This bar 227 normally inclines downwardly from the shaft 225, with the flange 228 resting on the guide rails 55, as shown in dotted position at 229, FIGURE 14. With the bar 227 in this position, the forward edge of the flat collapsed carton, advanced by the carton feeding mechanism, engages the flange 228 and, upon continued forward movement of the bar 125 and the advancing assembly attached thereto, the forward edge of the collapsed carton causes the bar 227 to swing upwardly. In FIGURE 14, the position of the bar, indicated by dotted outline 230, illustrates the carton having assumed a rhombus, cross-sectional form. Upon the carton feeding assembly reaching the forward end of its stroke, the carton is advanced to square expanded form, indicated in full line, FIGURE 14. When the carton has been moved forward to full rectangular expanded form, as shown in FIGURE 14, the lower rear edge of the carton is engaged by retaining members 230. These members are pivotally mounted on studs 231 mounted on the rails 55. The rear ends of the members 230 are bent inwardly as at 233, see FIGURES 1 and 5, to provide weight for swinging the forward ends of the members upwardly above the plane of the rails 55 in position behind the rear edge of the expanded carton. These retaining members 230 are cooperable with the flange 228 on the bar 227, and with an angle plate 235 fixed to the angle plate 223 to maintain the carton in expanded rectangular form, as shown in FIGURE 14.

The plates 200 extend forwardly of the loading station. These plates are formed with notches of rhombus form extending inwardly from their inner edges to receive end flap engaging plates 237 of complemental shape, see FIGURE 1. These plates are fixed at their rear outer edges to stems 240, journalled in bearings 241 fixedly mounted on the top surface of the plates 200. An actuating arm 243 is fixedly secured to and depends from each of the plates 237 for engagement by rollers 244 extending outwardly from the rear ends of the bars 127. Normally, the plates 237 lie flush with the plates 200. Accordingly, as the collapsed carton is advanced, the end flaps 197, 245, and the flaps 246 are positioned above the plates 200, and the end flaps 198 are positioned below the plates 200. Inasmuch as the flap folding plates 237 lie flush in the plates 200, the plates 237 are like-wise interposed between the flaps 198, 245, when the carton has been advanced to the position shown in FIGURE 13, where the front edge of the carton has engaged the flange 228 on the expanding bar 227. At this time, as illustrated in FIGURE 13, the rollers 244 are moved into engagement with the actuating arms 243, and further advancement of the carton feeding mechanism effects upward swinging movement of the plates 237 about the axis of the stems 240.

The plates 237 accordingly, in their swinging movement, assist materially in expanding the carton to the full rectangular form shown in FIGURE 14. When the flap folding plates 237 have been moved to vertical position in FIGURES 5 and 14, they move out from under the flaps 245.

Figure 1:
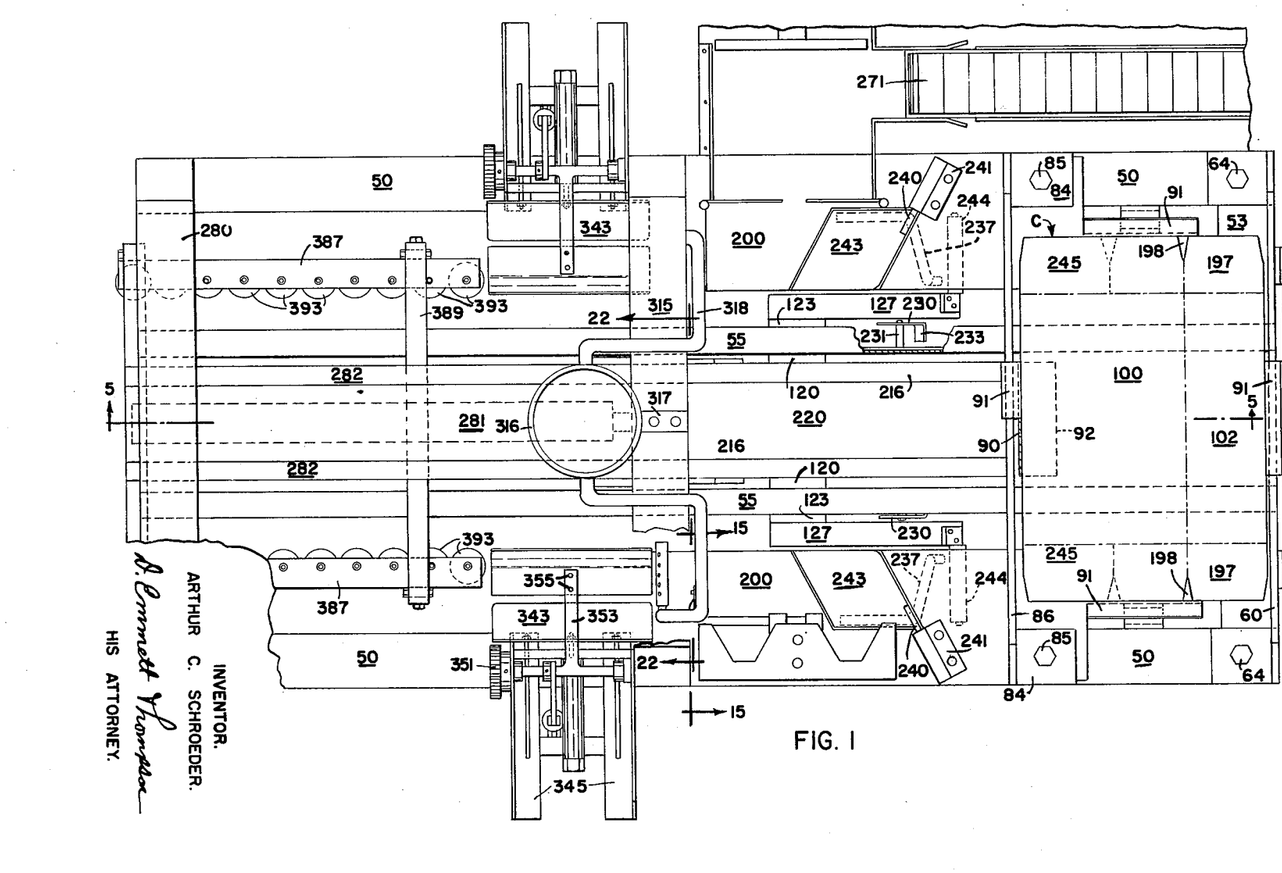
FIGURE 1 is a top plan view of a carton handling machine embodying my invention, with parts broken away.

When the carton has been advanced and expanded to full rectangular form, as shown in FIGURE 14, the flaps 245 extend horizontally from the ends of the top panel 100, and the flaps 197, 246 are disposed vertically, extending from the vertical side walls 103, 102. As previously stated, the flaps 197, extending from the bottom side panel 101, are positioned below the plates 200. When the carton is advanced to this position, the right-hand end of the carton, that is—the lower end as viewed in FIGURES 1 and 13, is positioned in registration with a folding plate 250.

Because the expanded carton is securely positioned in expanded form by the flange 228 engaging the upper forward corner of the carton by the fixed bracket 235 engaging the upper rear corner, and by the retaining members 230 engaging the lower rear corner, the carton feeding mechanism may be thereupon moved rearwardly, permitting the folding plates 237 to return in flush relation to the plates 200 upon initial return movement of the carton feeding mechanism.

Figure 15:
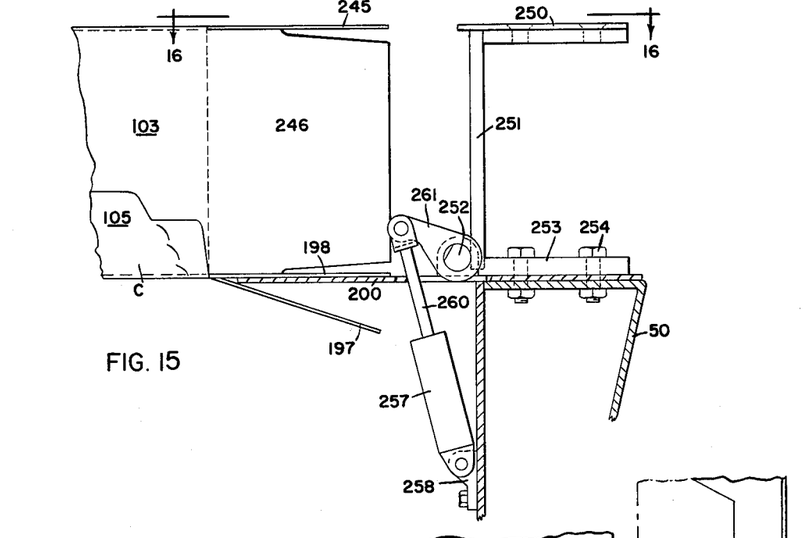
FIGURE 15 is a view taken on line 15—15, FIGURE 1, illustrating the mechanism for closing the vertical end flaps of the expanded carton.

The plate 250 is of rectangular form, and is mounted at the free end of an arm 251, the lower end of which is fixedly secured to a shaft 252 journalled in a bifurcated bracket 253 fixedly secured to the plate 200, as by bolts 254, which pass through the plate and the upper wall of the side member 50, see FIGURES 13 and 15. The plate 250 is formed with a pair of V-shaped notches 255 extending inwardly from its inner edge, as viewed in FIGURES 13 and 16. When the carton has been expanded, the arm 251 is moved in a counter-clockwise direction, FIGURE 15, by the admission of fluid at the upper end of a cylinder 257 pivotally secured at its lower end to a bracket 258 fixed to the inner side wall of the side frame member 50. Admission of fluid to the upper end of the cylinder effects downward movement of the piston rod 260, the upper end of which is pivotally attached to an arm 261, fixed to the shaft 252.

Figures 16, 17:
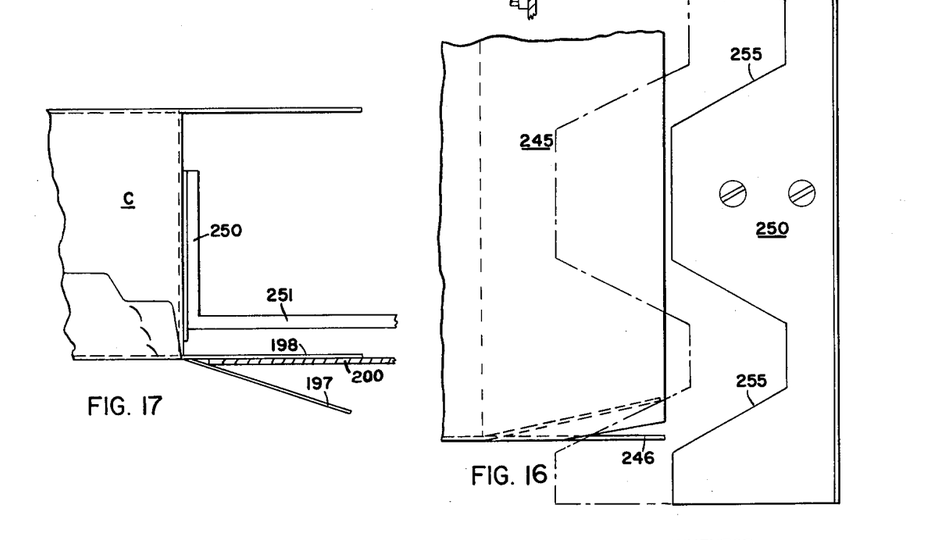
FIGURE 16 is a partial plan view of the structure shown in FIGURE 15.
FIGURE 17 is a view showing the flap folder in FIGURE 15 moved downwardly to effect folding of the flaps.

This inward swinging of the arm 251 moves the plate 250 into engagement with the vertically disposed end flaps 246, 197, and, because of the V-formation of the notches 255, these flaps are folded inwardly to closed position. This folding operation is illustrated in FIGURES 16 and 17. When the arm 251 has been moved to horizontal position, and the folding plate 250 to vertical position, the flaps 246, 197, have been folded inwardly and are held in that position by the plate 250, as shown in FIGURE 17.

Figure 18:
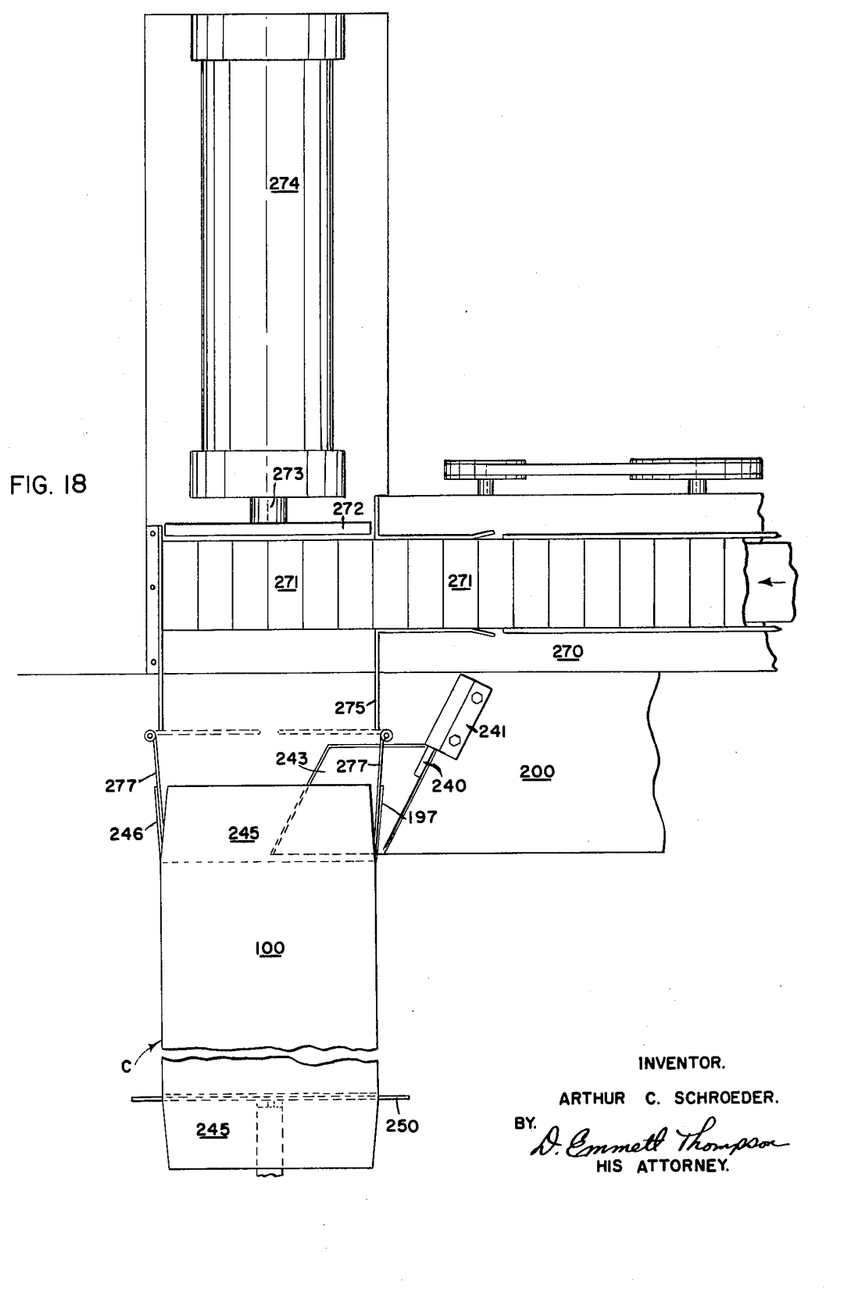
FIGURE 18 is a top plan view of the carton in expanded form at the loading station, and the loading mechanism.

The expanded carton is now ready to be loaded, which is accomplished by the arrangement shown schematically in FIGURE 18. This arrangement consists of a conveyor 270, which extends parallel with the carton handling machine, and functions to advance a single file procession of articles 271 against a guide plate 272. When a selected number of articles 271 have been thus accumulated, they are pushed into the expanded carton by a pad 272 mounted on the end of a piston rod 273 actuated by a cylinder 274. The group of articles 271, FIGURE 18, are moved toward the open end of the carton between the guide plate 272 and a guide plate 275. Gate plates 277 are mounted for pivotal movement, and the advancement of the group of articles 271 causes the gates 277 to swing toward the carton from the dotted line position to the full line position, FIGURE 18. These gates serve to swing the vertically disposed flaps 197, 246, at that end of the carton outwardly for the ready admission of the articles into the expanded carton.

A cross member 280 is fixedly secured to the forward ends of the side members 50. A guide housing is fixedly secured at one end to the cross member 280 and at its opposite end to the cross member 86. This guide housing is formed with a flat wall 281 and depending diverging sides 282, FIGURES 4 and 21. The lower portions of the sides 282 are bent inwardly to form horizontally disposed flanges 283.

Figure 21:
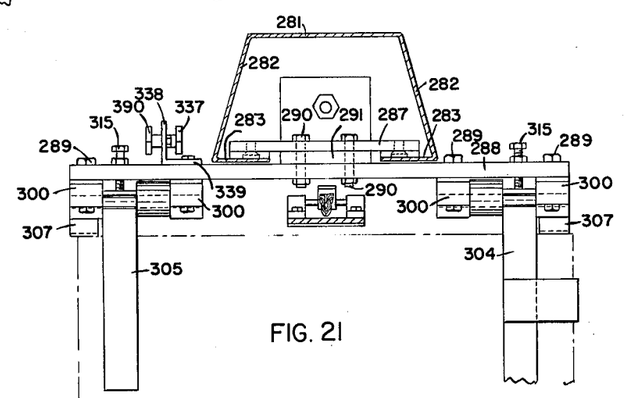
FIGURE 21 is a view taken on line 21—21, FIGURE 19.

Referring to FIGURES 5 and 21, a transversely extending cross bar 287 is arranged with its end portions overlapping the flanges 283. A second cross bar 288 is fixedly secured to the bar 287, as by bolts 290, and there is a spacer block 291 arranged between these bars so that the assembly is arranged for reciprocation on the flanges 283. The bar 287 is formed with an upstanding flange 293. see FIGURE 5, to which is secured a piston rod 294 mounted in a cylinder 295, the forward end of which is affixed to a plate 297, as by bolts 298. The plate 297 is affixed to the top wall 281 of the guide housing by bolts 299.

A pair of bearing blocks 300 is affixed to the under side of the bar 288 at each end thereof, as by bolts 301. A shaft 303 is journalled in these bearings, and there is fixedly secured to the shafts arms 304, 305. The arms normally hang vertically from the shafts. When the expanded carton has been loaded at the loading station, fluid admitted to the front end of the cylinder 295 affects rearward movement of the bar assembly 287, 288, from the position shown in FIGURE 5 to the position shown in FIGURE 20. Upon such rearward movement, the arms 304, 305 swing in a clockwise direction upon engagement with the upper front corner of the loaded carton, as illustrated in dotted line, FIGURE 20. Upon continued rearward movement of this assembly, the arms 304, 305, ride over the top of the loaded carton, and when the assembly reaches full rear position, as shown in full line, FIGURE 20, the arms swing downwardly to the vertical position.

Figure 20:
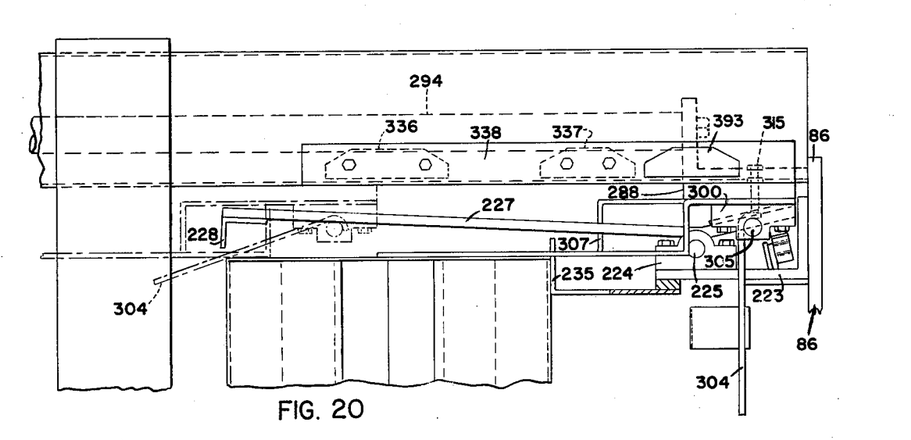
FIGURE 20 is an end view of the upper portion of the loaded carton and the machine structure positioned above the loaded carton preparatory to the advancement of the carton from the loading station.

Hold-down arms 307 are clamped at their rear ends between the outer bearing 300 of each pair, and the cross bar 288. These arms extend forwardly and downwardly, and thence forwardly to engage the top wall panel 100 of the loaded carton as this carton advancing assembly is moved to the rear position, shown in FIGURE 20. The shafts 303 are spaced rearwardly of the loaded carton a distance sufficient for the ends of the arms 304, 305, to move off from the top of the carton, permitting the arms to swing down to vertical position, as shown in FIGURE 20. With the carton advancing assembly in this position, the cross bar 288 engages a tail portion 310 on the expanding bar 227. As this tail portion is cammed downwardly, the flange 228 is lifted upwardly above the top of the loaded carton, as shown in full line, FIGURE 20.

Admission of fluid to the rear end of the cylinder 295 will effect forward movement of the carton advancing assembly moving the depending arms 304, 305, into engagement with the rear side of the loaded carton. Counter-clockwise rotation from vertical position of arms 304, 305, is prevented by stop screws 315 threaded through the bar 288 and engaging rearwardly bent ends on the arms, as shown in dotted outline, FIGURE 20. With this arrangement, the loaded carton is moved forwardly to the position shown in FIGURE 5.

Figure 22:
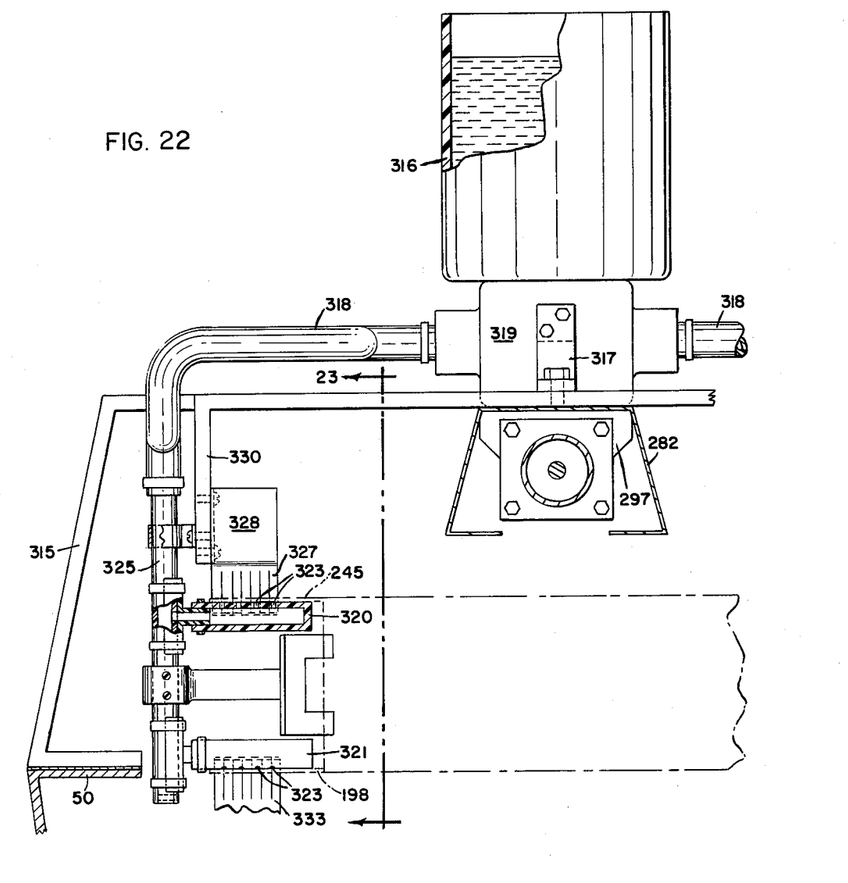
FIGURE 22 is a view taken on line 22—22, FIGURE 1.

A cross member is mounted on the side members 50 intermediate the loading station and the flap closing station, this being approximately in the center of the machine. A glue tank 316 is mounted on the cross member 315 at the center thereof by means of an angle bracket 317, FIGURES 1, 22 and 23. Conduits 318 extend laterally from a glue pump 319, and thence downwardly to supply liquid glue to applicators 320, 321. These applicators are in the form of horizontally disposed cylindrical members formed of yieldable material and closed at their outer ends. The applicators are formed of rubber, or plastic. The upper applicator 320 is formed, on its upper surface, with a plurality of small apertures 323, and the lower applicator 321 is formed with a row of similar apertures on its under side. These applicators are fixedly secured to a vertical conduit 325 connected to the conduits 318. As the loaded carton is advanced from the loading station by the arms 304, 305, of the carton advancing mechanism, the horizontally disposed top flaps 245 are pressed against the applicators 320 by a series of light spring fingers 327, which incline downwardly and rearwardly from an angle portion 328, fixedly secured to a bracket carried by the cross member 315, and having depending leg portions 330. The flaps 198, extending outwardly from the bottom side panels 101 of the carton, are pressed upwardly against the lower applicators 320 by a similar spring arrangement 333, the angle portion 324 of which is secured to the inner surface of the side member 50.

Figure 19:
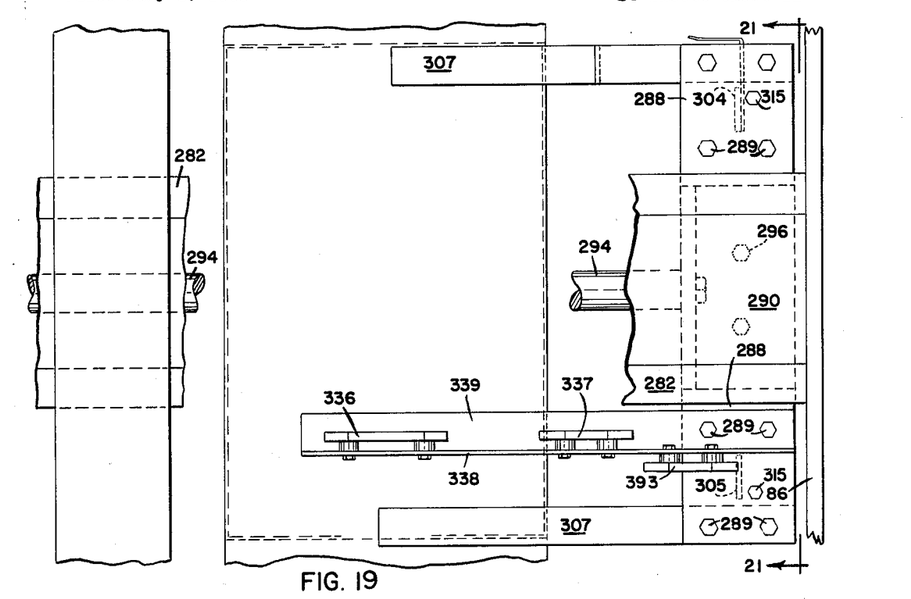
FIGURE 19 is a top plan view of the loaded carton positioned at the loading station.

As the loaded carton is advanced from the loading station past the glue applicators 320, 321, to the flap sealing station, the glue pump 319 is actuated twice by cam members 336 and 337, FIGURE 19, which are mounted in spaced relation upon the inner surface of a vertical flange 338 of an angle member 339 secured to the bar 288.

These cams successively actuate a valve, not shown, mounted on the cross member 315 as the carton advancing member moves forwardly.

Figure 23:
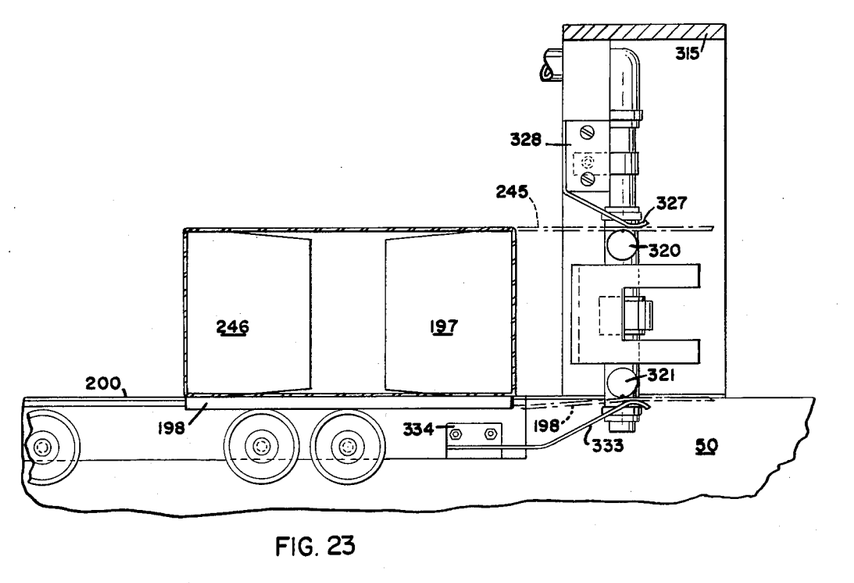
FIGURE 23 is a view taken on line 23—23, FIGURE 22.

The reason for making two spaced applications of glue on the flaps 245, 198, is that the infolded vertically disposed flaps 245, 197, have their confronting edges, when in folded condition, spaced apart as shown in FIGURE 23. Accordingly, the glue is applied at each end portion of the flaps 198, 245, so that they are adhered to the flaps 197, 246, and not adhered to the packages 271 inserted into the carton.

As the loaded carton is advanced from the loading station past the glue applicators 320, 321, to the end flap sealing station 335, FIGURE 5, a plate 343 at the flap sealing station is moved inwardly and serves as a guide rail to make certain that the infolded vertically disposed flaps 197, 246, remain in folded position. The reciprocation of the carton advancing mechanism, including the arms 304, 305, is of such magnitude as to move the loaded carton to the station 355 in registration with the plates 343. During the dwell of the carton at this station, means is actuated to fold the horizontally disposed flaps 198, 245, inwardly to vertical position against the flaps 197, 246.

Figure 24:
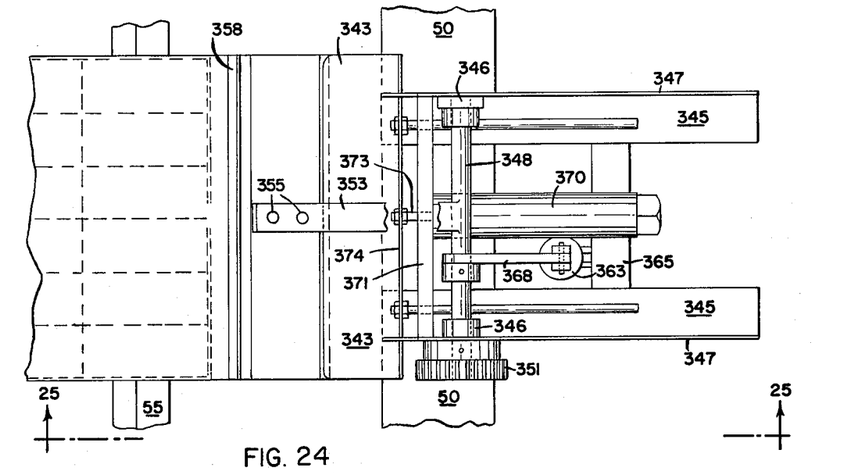
FIGURE 24 is a top plan view of one of the horizontal flap folding mechanisms shown at the bottom and upper left hand portion in FIGURE 1.
Figure 25:
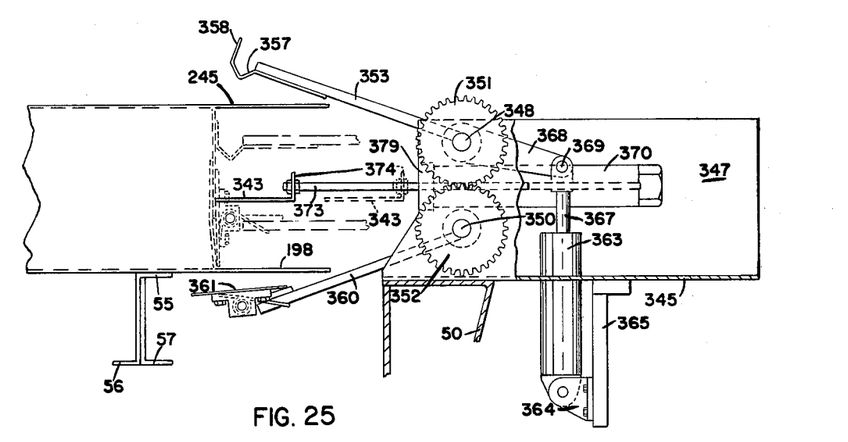
FIGURE 25 is a view on line 25—25, FIGURE 24.

This flap folding mechanism includes a pair of angle iron members 345 fixedly secured to the side frame members 50 and extending laterally therefrom, see FIGURES 1, 24 and 25. Bearing members 346 are mounted in the vertically disposed flanges 347 of the angle members 345. An upper shaft 348 is journalled in a pair of bearings 346, and a lower shaft 350 is journalled in a pair of the bearings 346. The shafts 348, 350, are rotatively connected together by spur gears 351, 352.

An arm 353 is fixedly secured to the shaft 348. A flap engaging member is secured to the outer end of the arm 353, as by rivets 355, and is formed with a V-groove 357 terminating in a flange 358 extending normal to arm 353. An arm 360 is fixed to the shaft 350 and has pivotally mounted at its outer end a flap engaging plate 361.

After the loaded carton has arrived at the flap sealing station, fluid is admitted to the lower end of a cylinder 363 pivotally connected at its lower end to a bracket 364 secured to a cross member 365 secured to the under side of the angle irons 345.

Admission of fluid to the lower end of this cylinder effects outward movement of the piston rod 367, the upper end of which is pivotally attached to an arm 368, as at 369. The arm 368 is also fixedly secured to the upper shaft 348. This actuation results in rotation of the upper shaft 348 in a counter-clockwise direction to move the flap engaging blade 358 into engagement with the upper flap 245, and clockwise rotation of the lower shaft 350, FIGURE 25, to move the flap engaging plate 361 into engagement with the lower flap 198. During movement of these flap engaging parts, the plate 343 is moved outwardly to the dotted line position, this movement being effected by the admission of fluid to the inner end of a cylinder 370 carried by a cross member 379 secured to the angle irons 345. This results in the outward movement of a piston rod 373 which is affixed to an upstanding flange 374 of the plate 343. The timing is such that the plate 343 is moved outwardly so as not to interfere with the folding of the flaps 198, 245.

Upon the next actuation of the carton advancing mechanism by the cylinder 295, the loaded carton at the loading station is moved against the carton at the flap sealing station and that carton is advanced into a carton compression section between the compression rollers 383.

When the carton feeding mechanism, carried by the bar 125, has reached forward position, with the carton expanded at the carton loading station, a spring pressed plunger 390 mounted on the bar 125, FIGURES 4 and 5, engages and actuates a valve 331 mounted on a bracket 392 fixed to the flanges 56 of the guide rails 55. Actuation of the valve 331 admits fluid to the forward end of the cylinder 207 to immediately effect return movement of the carton feeding mechanism to rear position.

When the carton at the loading station has been loaded and the presser pad 272 returns to out position, as shown in FIGURE 18, a valve, not shown, admits fluid to the forward end of the cylinder 295 causing the carton advancing mechanism to move to the position shown in FIGURES 19 and 20. Upon reaching this position, a cam 393 also mounted on the angle bracket 338, actuates a valve, not shown, to reverse the application of fluid to the cylinder 295 to move the carton advancing mechanism and the loaded carton toward the flap sealing station. When this mechanism has traveled forwardly about one-half of its stroke, the cam 393 actuates a second valve, not shown, to admit fluid to the rear end of the cylinder 207 to effect forward movement of the bar 125 and the carton feeding mechanism carried thereby.

What I claim is:

1. Apparatus for selecting and expanding a paperboard carton formed with end flaps comprising a frame, an elongated guideway, a magazine mounted above said guideway at one end thereof for receiving a stack of flat collapsed cartons with the end flaps of said cartons extending laterally from said guideway, a carton feeding mechanism mounted for reciprocation in said guideway, said feeding mechanism being operable upon rearward movement to select a carton from the magazine for deposit on said guideway and, upon forward movement, to advance said selected carton to a loading station located along said guideway forwardly of said magazine, a carton flap guide plate spaced outwardly from each side of said guideway and extending from said magazine to said loading station, means operable to position selected ones of the end flaps of said advancing carton above said guide plates, and other of said flaps below said guide plates, a carton expanding mechanism at said loading station including a flap folding plate mounted in each of said flap guide plates at said loading station and normally lying flush in said guide plates, means operable to move said flap folding plates to vertical position when said carton feeding mechanism has advanced a carton to said loading station.

2. A carton handling apparatus, as defined in claim 1, wherein said flap folding plates are of rhomboid form and are mounted in said flap guide plates for movement about an axis coincident with their rear edges.

3. A carton handling apparatus, as defined in claim 1, wherein said carton feeding mechanism is provided with means operable during the latter portion of the forward movement of said mechanism for moving said flap folding plates to vertical position.

4. A carton handling apparatus, as defined in claim 1, and including carton retaining members mounted on said guideway and movable into engagement with the rear lower edge of the expanded carton.

5. A carton handling apparatus, as defined in claim 1, including a bracket fixedly mounted on said frame and positioned for engagement by the upper rear edge of the expanded carton.

6. An apparatus for selecting and expanding a paperboard carton formed with end flaps comprising a frame, an elongated guideway, a magazine mounted above said guideway at one end thereof for receiving a stack of flat collapsed cartons with the end flaps thereof extending laterally from said guideway, a carton feeding mechanism mounted for reciprocation in said guideway, said feeding mechanism being operable upon rearward movement to select a carton from the magazine for deposit on said guideway and upon forward movement to advance said selected carton to a loading station located along said guideway forwardly of said magazine, a carton flap guide plate spaced outwardly from each side of said guideway and extending parallel thereto from said magazine to said loading station, means operable to position selected ones of the end flaps at each end of said advancing carton above said guide plates, and other of said flaps below said guide plates, a flap folding plate mounted in each of said flap guide plates at said loading station and normally lying flush in said guideways, a carton expanding bar pivotally supported above said guideway and adapted to engage the forward edge of a collapsed carton as it approaches said loading station and cooperable with said carton feeding mechanism to expand the collapsed carton during the latter portion of the forward movement of said carton advancing mechanism, and means operable to move said flap folding plates to vertical position during said latter movement of the carton feeding mechanism.

7. A machine for handling paperboard cartons having an exterior unadhered flap on one side comprising an elongated frame, a guideway extending lengthwise of the frame, a magazine mounted above the guideway at one end thereof for receiving a stack of flat collapsed cartons, with the unadhered flaps extending forwardly on the underside walls thereof, a carton expanding and loading station along said guideway forwardly of said magazine, a carton feeding mechanism mounted for reciprocation in said guideway, said feeding mechanism having a flap engaging member, means operable to move said flap engaging member into engagement with the unadhered flap on the lowermost carton in said stack upon rearward movement of said feeding mechanism to effect rearward movement of said lowermost carton for deposit on said guideway, said feeding mechanism also having means for engaging the rear edge of the selected carton for advancing the same to said station upon forward movement of said feeding mechanism, carton expanding means at said expanding and loading station, and operable to expand said flat collapsed carton to tubular form for the reception of articles.

8. A carton handling apparatus, as defined in claim 7, including means for moving said blade out of engagement with said flap upon forward movement of said carton feeding means.

9. A carton handling apparatus, as defined in claim 7, wherein said means for engaging the rearward edge of the selected collapsed carton is located a distance rearwardly of said blade greater than the distance between the unadhered flap and the rear edge of the carton.

10. Apparatus for handling paperboard cartons formed with end flaps, an elongated guideway, a magazine mounted at one end of said guideway for receiving a stack of flat collapsed cartons disposed transversely of said guideway with the end flaps of said cartons extending laterally from the guideway, a carton feeding mechanism mounted for reciprocation in said guideway and being operable to select a carton from said magazine and advance said selected carton to a loading station located along said guideway forwardly of said magazine, means operable at said loading station to expand said carton to tubular form, with the end flaps associated with the front and rear sides of said expanded carton being disposed vertically and extending laterally from said guideway, a flap folding and back-up plate disposed horizontally above said guideway in outwardly spaced relation from said end flaps, the edge portion of said plate confronting said carton being formed with a notch in registration with each of said end flaps, said notches being formed with sides inclining toward the center of said plate, means operable to move said plate over an arcuate path downwardly and inwardly toward the carton to a vertical position, said inclined sides of said notches engaging the outer edges of said flaps during such arcuate movement, and moving the flaps inwardly to closed position, said plate in said vertical down position overlying said folded flaps.

No references cited.

FRANK E. BAILEY, *Primary Examiner.*